United States Patent
Hwang et al.

(10) Patent No.: US 7,584,624 B2
(45) Date of Patent: Sep. 8, 2009

(54) APPARATUS FOR PREVENTING LIQUID REFRIGERANT ACCUMULATION OF AIR CONDITIONER AND METHOD THEREOF

(75) Inventors: Il Nahm Hwang, Ansan-si (KR); Young Min Park, Incheon-si (KR); Yoon Been Lee, Seoul (KR); Dong Jun Yang, Seoul (KR); Seok Ho Yoon, Seoul (KR); Jong Han Park, Gwangmyeong-si (KR); Sung Oh Choi, Gwangmyeong-si (KR); Sung Chun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 739 days.

(21) Appl. No.: 10/929,457

(22) Filed: Aug. 31, 2004

(65) Prior Publication Data

US 2005/0081537 A1 Apr. 21, 2005

(30) Foreign Application Priority Data

Oct. 20, 2003 (KR) .................... 10-2003-0072993

(51) Int. Cl.
*F25B 31/00* (2006.01)
*F25B 43/02* (2006.01)
*F25B 1/10* (2006.01)
*F04B 17/00* (2006.01)

(52) U.S. Cl. .................... 62/192; 62/84; 62/510; 417/372

(58) Field of Classification Search .......... 62/84, 62/160, 175, 157, 468, 192, 228.5, 510; 417/7, 417/372

See application file for complete search history.

(56) References Cited

U.S. PATENT DOCUMENTS 2,276,814 A 3/1942 Zwickl (Continued)

FOREIGN PATENT DOCUMENTS

| EP | 0240441 | 10/1987 |
|---|---|---|
| EP | 0672875 | 9/1995 |
| EP | 0894651 | 2/1999 |
| GB | 2250579 | 6/1992 |

OTHER PUBLICATIONS

U.S. Appl. No. 10/643,911, to Park et al.
U.S. Appl. No. 10/828,179, to Kim.

*Primary Examiner*—Chen-Wen Jiang
(74) *Attorney, Agent, or Firm*—McKenna Long & Aldridge LLP

(57) ABSTRACT

Disclosed is an apparatus and method for preventing liquid refrigerant accumulation in an accumulator of an outdoor unit of an air conditioner. The method includes the steps of: determining a state of a compressor; if the compressor is in standby mode or off state, turning on a four-way valve; determining whether the state of the compressor in standby mode or off state continues longer than a predetermined amount of time; and if the state of the compressor continues longer than the predetermined amount of time, closing an expansion valve. Particularly, high-pressure refrigerant flows in the closed expansion valve while low-pressure refrigerant flows in a check valve through the four-way valve. The apparatus includes a suction pipe connected to spray oil of the accumulator to the compressor; a liquid recovery pipe with one end being connected to the suction pipe and the other end being connected to the accumulator; and a liquid recovery valve for controlling opening/closing of the liquid recovery pipe, in which a compressor of the air conditioner in cooling or heating mode is operated and a liquid recovery valve for controlling a liquid recovery pipe connected to the compressor and an accumulator is opened to reduce oil in the accumulator. According to the present invention, when the compressor is off, it is possible to prevent liquid refrigerant accumulation by changing refrigerant flow line to the accumulator and the refrigerant at the lower end of the accumulator can be recovered.

14 Claims, 8 Drawing Sheets

U.S. PATENT DOCUMENTS

| | | |
|---|---|---|
| 3,110,164 A | 11/1963 | Smith |
| 4,576,555 A * | 3/1986 | Ashenfelter ................. 417/372 |
| 4,672,822 A * | 6/1987 | Iijima et al. ................... 62/468 |
| 4,693,089 A | 9/1987 | Bourne et al. |
| 5,025,634 A | 6/1991 | Dressler |
| 5,174,365 A | 12/1992 | Noguchi et al. |
| 5,605,058 A | 2/1997 | Kurachi et al. |
| 6,148,632 A | 11/2000 | Kishita et al. |
| 6,276,148 B1 | 8/2001 | Shaw |
| 2002/0116940 A1 * | 8/2002 | Levitin et al. ................. 62/192 |
| 2003/0233838 A1 | 12/2003 | Lee et al. |

* cited by examiner

APPARATUS FOR PREVENTING LIQUID REFRIGERANT ACCUMULATION OF AIR CONDITIONER AND METHOD THEREOF

BACKGROUND OF THE INVENTION

1. Field of the Invention

The present invention relates to an air conditioner, more particularly, to an apparatus for preventing liquid refrigerant accumulation of air conditioner and a method thereof.

2. Discussion of the Background Art

In general, an air handling unit is a device for air conditioning or heating a defined indoor space including a residential space, restaurant, or office. Recently, development for a multi air handling unit has been conducted for air conditioning or heating a multi-room indoor space more effectively by air conditioning or heating each room at the same time.

A cooling cycle is often applied to the air handling unit. In the cooling cycle, when working fluid passes through a compressor, an outdoor heat exchanger (condenser), an expansion valve, and an indoor heat exchanger (evaporator), it transfers heat from low-temperature refrigerant to high-temperature refrigerant to perform air conditioning or heating or air conditioning/heating.

FIG. 1 is a schematic diagram of a related art cooling cycle.

As shown in FIG. 1, the related art cooling cycle includes a compressing unit 2a, 2b with a plurality of compressors for compressing refrigerant to high-temperature, high-pressure vapor refrigerant; a plurality of oil separators 4a, 4b for separating oil from the refrigerant discharged from the compressing unit 2a, 2b; a four-way valve 6 disposed on the discharge side of the compressing unit 2a, 2b and changing the flow of the refrigerant in cooling mode or heating mode; an outdoor heat exchanger 8 for performing heat exchange on the refrigerant with outdoor air to condense the refrigerant to mid-temperature, high-pressure liquid refrigerant in cooling mode; an expansion valve 10 for passing the refrigerant (compressing the refrigerant in heating mode) that passed through the outdoor heat exchanger 8; an indoor heat exchanger 22 for performing heat exchange on low-temperature, low-pressure refrigerant that passed through an EEV 21 and the expansion valve 21 and indoor air; and an accumulator 12 for separating liquid refrigerant from the refrigerant that passed through the indoor heat exchanger 22 and supplying only vapor refrigerant to the compressing unit 2a, 2b.

Here, the compressing unit 2a, 2b includes a constant-speed compressor 2a that rotates at a constant speed and an inverter compressor 2b whose rotational speed is variable and thus, air conditioning performance can be improved and air conditioning capacity can be varied as well. Inside of the constant-speed compressor 2a and inverter compressor 2b is oil to be circulated with the refrigerant, to improve reliability and working efficiency of the compressor.

Also, a first oil separator 4a is installed at the rear end of the constant-speed compressor 2a and a second oil separator 4b is installed at the rear end of the inverter compressor 2b, each separating oil from the refrigerant discharged from the respective compressors 2a, 2b and recirculating the refrigerant to each compressor 2a, 2b.

In the case of a cooling cycle mounted with a plurality of compressors, it is important that the amount oil that circulates inside of each compressor should be same to operate the compressors more efficiently. To this end, a pressure regulating tube for equalizing pressure 14 is mounted in a lower end between the constant-speed compressor 2a and the inverter compressor 2b to maintain oil level inside the compressors 2a, 2b.

When power is applied, the inverter compressor 2b immediately varies rpm (revolution per minute) in response to an input signal and adjusts refrigerant flow circulating in the cooling cycle to be adequate for cooling capacity. In the case that the inverter compressor 2b does not meet requirements for the cooling capacity, the constant-speed compressor 2a too adjusts refrigerant flow circulating in the cooling cycle to increase cooling efficiency.

Also, check valves 5a, 5b are disposed on the discharge side of the compressors 2a, 2b, respectively, to prevent the refrigerant from flowing inversely. That is, when only one of the compressors 2a, 2b is in operation, the check valve prevents the refrigerant from the condenser 8 flowing into the other compressor that is not in operation.

The accumulators 12a, 12b pass through only low-temperature, low-pressure vapor refrigerant generated by the indoor heat exchanger of an indoor unit 20 and if liquid refrigerant flows in, they accumulate the liquid refrigerant to prevent malfunction of the compressing unit 2a, 2b.

In cooling mode, therefore, the compressed refrigerant by the compressing unit 2a, 2b of an outdoor unit 1 is radiated from the outdoor heat exchanger 8 and condensed, and then decompressed and expanded while passing through a corresponding EEV 21 of each indoor unit 20 through a service valve 16a. This decompressed, expanded refrigerant absorbs latent heat around the indoor heat exchanger 22 and is evaporated.

In heating mode, on the other hand, the compressed refrigerant by the compressing unit 2a, 2b is radiated from a corresponding indoor unit 1 and raises the indoor temperature, and then decompressed and expanded while passing through a corresponding EEV 21 of the outdoor unit 22 through the service valve 16a. This decompressed, expanded refrigerant absorbs latent heat around the outdoor heat exchanger 22 and is evaporated.

When the air conditioner is in standby mode, the compressors 2a, 2b and the four-way valve 6 are turned off.

In FIG. 1, the solid line indicates a refrigerant flowing direction when the air conditioner is in standby mode, and the slant line indicates a state where the four-way valve is off, and the refrigerant in the indoor unit and connecting pipe flows in the outdoor unit 1 and is accumulated in the accumulators 12a, 12b and partly in the lower part of the compressors 2a, 2b.

At this time, if the refrigerant is accumulated in the lower part of the compressors 2a, 2b, it dilutes oil inside the compressors in operation and causes lubrication problems, resulting in damages on the compressors and decrease of reliability. In another case, it is also possible that the refrigerant accumulated in the accumulators 12a, 12b may over flow and flow in the compressors, bringing damages to the compressors 2a, 2b and decreasing the reliability of the compressors 2a, 2b.

In the case of a multi-system, the longer the pipe is, the greater amount of refrigerant is distributed to the indoor unit 20, not the outdoor unit, and in the connecting pipe. Therefore, when the outdoor unit 1 is in standby mode, liquid refrigerant is accumulated even in the outdoor unit 1 more often.

FIG. 2 illustrates an oil recovery pipe structure in an accumulator.

As shown in FIG. 2, it is impossible to recover oil accumulated at the bottom of the oil recovery pipe and thus, the oil keeps accumulating at the bottom.

Due to the above problem, oil circulation amount is short and the reliability of the system is decreased.

FIG. 3 is a schematic diagram of a related art pipe structure around a compressor of an outdoor unit.

Pipes 152, 153 connected to a compressor 150 undergo a roofing treatment, and a separate focusing mass 140 is applied thereto. That is, low-temperature, low-pressure vapor refrigerant from an indoor unit (not shown) flows into the outdoor unit through an external pipe connected to a service valve 110, and liquid of this low-temperature, low-pressure vapor refrigerant is removed when it passes an accumulator 130 and the low-temperature, low-pressure vapor refrigerant is compressed by the compressor 150 and changes to high-temperature, high-pressure vapor refrigerant before flowing into a condenser.

Many times severe vibration occurs during the compressing process in the compressor 150 so it is necessary to control the transmission of this vibration to other parts of the system through suction and discharge pipes 152, 153 connected to the compressor 150. To control the transmission of the vibration, pipes can be elongated after the roofing treatment. Further, the focusing mass 140 made of elastic materials like rubber can be disposed at the lower portion of the roofed pipes, more particularly, at the lower end of roofing of the suction and discharge pipes 152, 153 of the compressor 150.

When the pipes connected to the compressor 150 and the accumulator 130 pass a reversing coil 120, the vibration is suppressed also. Here, the reversing coil 120 is disposed at an upper rear portion of the system not to interfere the pipes, and the entrance and exit of the reversing coil 120 are all faced to down.

Meanwhile, as for roofing of the suction pipe 152, the pipe is U bent from the accumulator 130 to the inverse direction and then L bent from the position of the reversing coil 119 upward and goes up straight. As for roofing of the discharge pipe 153, the pipe is U bent from a discharge unit to the inverse direction and U bent again along the bottom surface and then L bent from the position of the reversing coil 119 and lastly goes up straight.

Moreover, a vapor refrigerant pipe 151 for carrying the vapor refrigerant flowing in the compressor 150 does not undergo the roofing treatment but is connected directly to the reversing coil 120 and to the service valve 110 in consideration of the connection to an outside pipe.

SUMMARY OF THE INVENTION

An object of the invention is to solve at least the above problems and/or disadvantages and to provide at least the advantages described hereinafter.

Accordingly, one object of the present invention is to solve the foregoing problems by providing a method for preventing liquid refrigerant accumulation in case that an outdoor unit is in standby mode while power being turned on and a compressor being turned off, by changing a refrigerant flow line to an accumulator to ensure that liquid refrigerant exists between certain pipes.

Another object of the present invention is to provide an apparatus for preventing liquid refrigerant accumulation of an air conditioner, to recover refrigerant at the bottom of an accumulator.

The foregoing and other objects and advantages are realized by providing a method for preventing liquid refrigerant accumulation of an air conditioner, in which the method includes the steps of: determining a state of the compressor; if the compressor is in standby mode or off state, turning on the four-way valve; determining whether the state of the compressor in standby mode or off state continues longer than a predetermined amount of time; and if the state of the compressor continues longer than the predetermined amount of time, closing an expansion valve, wherein high-pressure refrigerant flows in the closed expansion valve and low-pressure refrigerant flows in the check valve through the four-way valve.

In an exemplary embodiment of the invention, if a start signal is inputted to the compressor, the four-way valve is controlled according to a cooling/heating mode, and the closed expansion valve is opened.

Another aspect of the invention provides an apparatus for preventing liquid refrigerant accumulation of an air conditioner, in which the apparatus includes: a suction pipe connected to spray oil of the accumulator to the compressor; a liquid recovery pipe with one end being connected to the suction pipe and the other end being connected to the accumulator; and a liquid recovery valve for controlling opening/closing of the liquid recovery pipe.

In an exemplary embodiment of the invention, the other end of the liquid recovery pipe is connected to a lower end of the accumulator to transfer the oil at the bottom of the accumulator to the suction pipe.

Still another aspect of the invention provides a method for preventing liquid refrigerant accumulation of an air conditioner, the method including the steps of: operating a compressor of the air conditioner in cooling or heating mode; and opening a liquid recovery valve for controlling a liquid recovery pipe connected to the compressor and an accumulator and reducing oil.

In an exemplary embodiment of the invention, if the air conditioner is in heating mode, the method includes the steps of: determining whether discharge temperature of the compressor is higher than a predetermined temperature; if the discharge temperature of the compressor is higher than the predetermined temperature, opening the liquid recovery valve disposed at the lower end of the accumulator; and after opening the liquid recovery valve, spraying low-pressure liquid refrigerant to the compressor to lower the discharge temperature of the compressor.

In an exemplary embodiment of the invention, if the air conditioner is in cooling mode, the liquid recovery valve is opened periodically to recover oil at the lower end of the accumulator.

According to the present invention, refrigerant flow into the accumulator is blocked and the refrigerant is placed in a refrigerant pipe instead. Thus, liquid refrigerant does not flow in the compressor and the reliability of the compressor is improved.

Also, in the case that liquid refrigerant is accumulated in the accumulator, the liquid refrigerant at the lower end of the accumulator is recovered periodically or on the basis of the discharge temperature of the compressor, so that the system never suffers from the lack of oil.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present an apparatus for preventing liquid refrigerant accumulation of an air conditioner and a method thereof according to a preferred embodiment of the invention in reference to the accompanying drawings.

Figure 1:
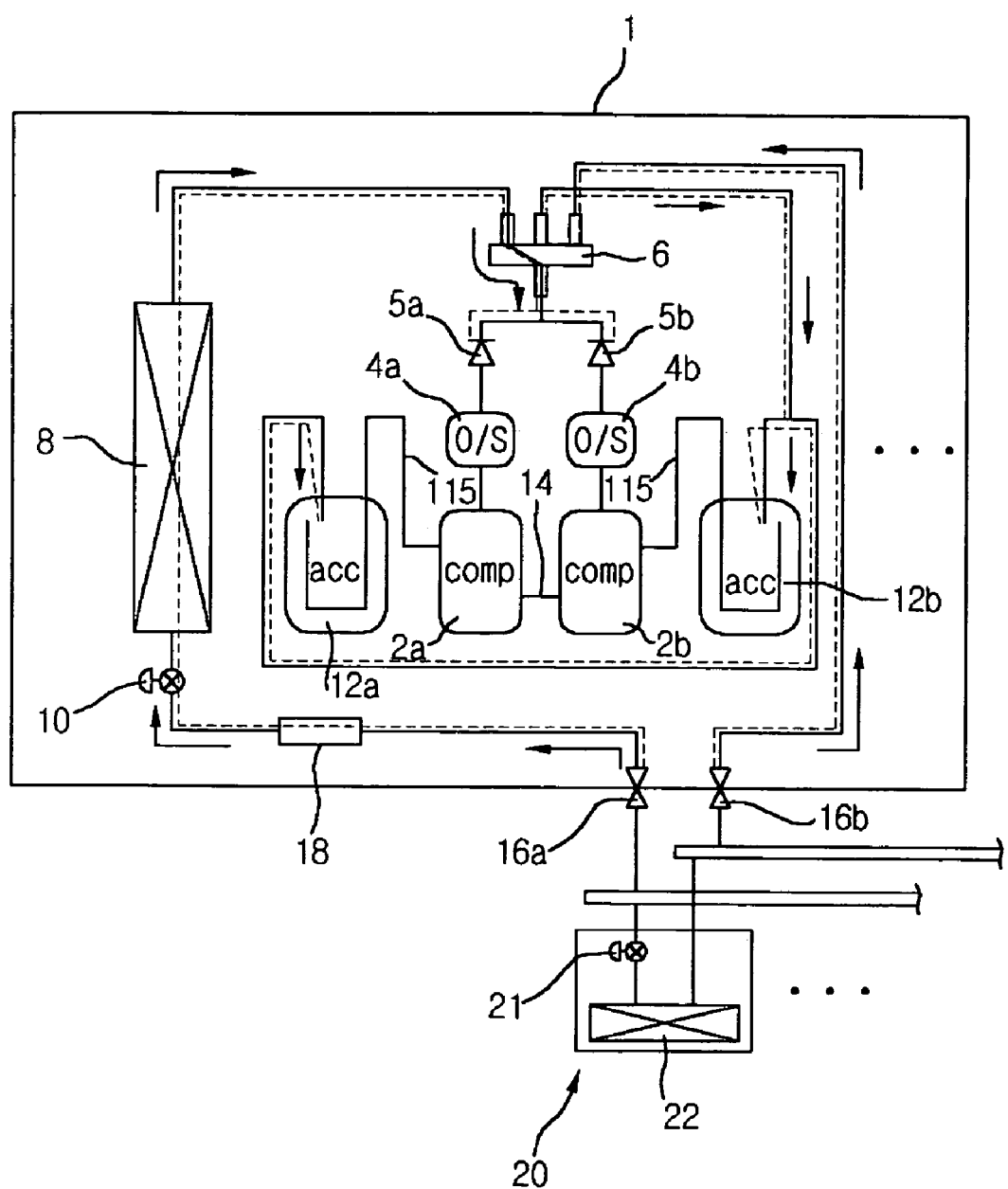
FIG. 1 is a schematic diagram illustrating liquid refrigerant accumulation in a related art.
Figure 2:
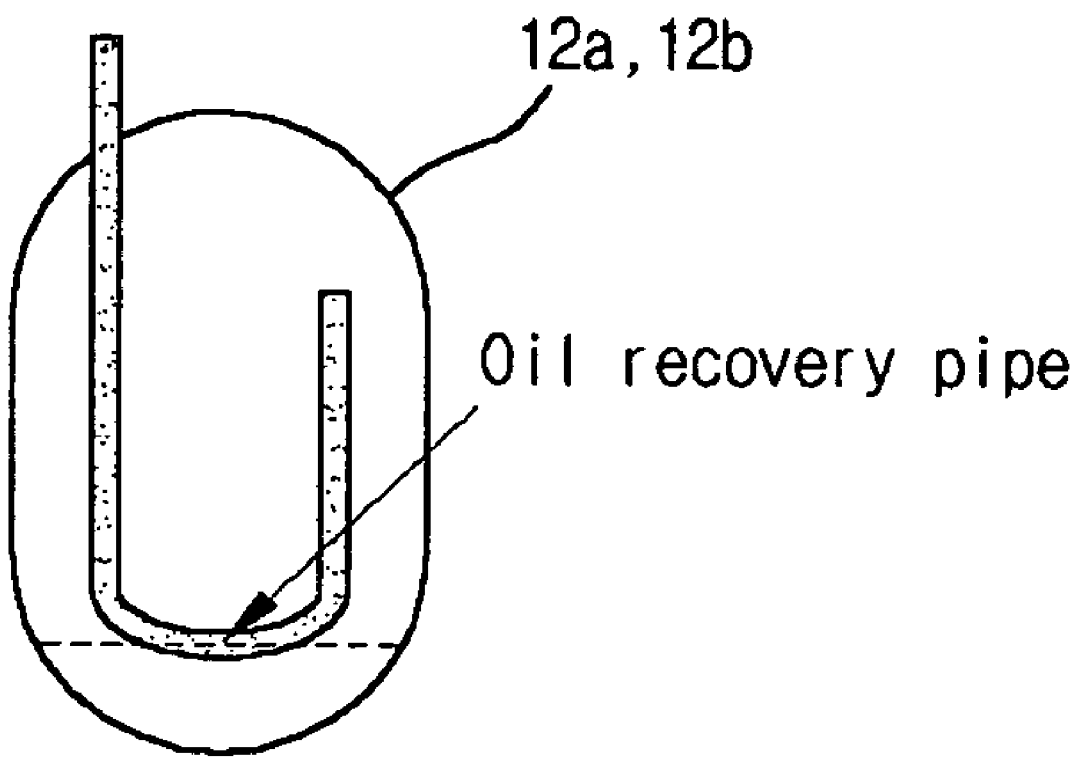
FIG. 2 illustrates a oil recovery structure in an accumulator.
Figure 3:
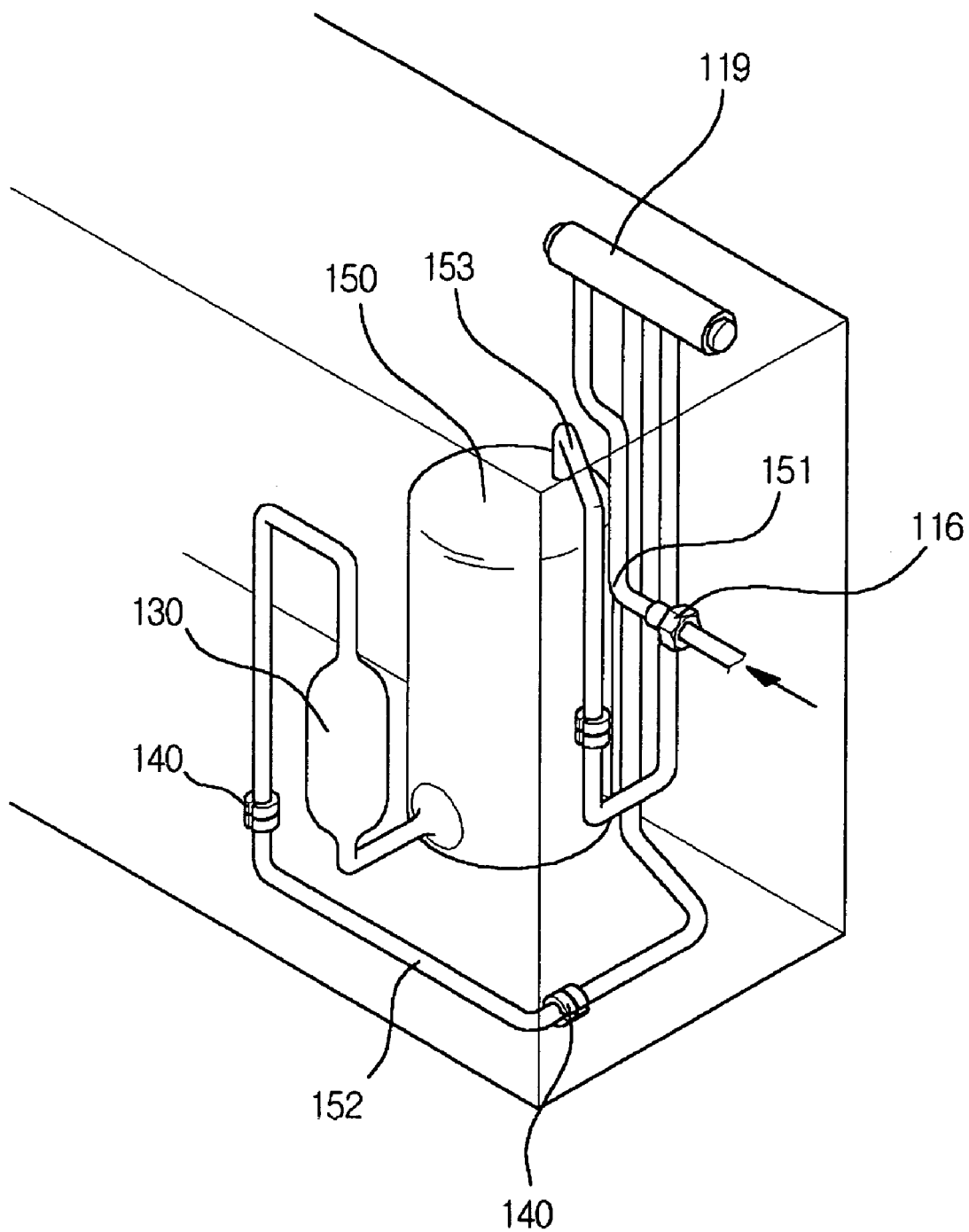
FIG. 3 is a schematic diagram of a related art pipe structure around a compressor of an outdoor unit.
Figure 4:
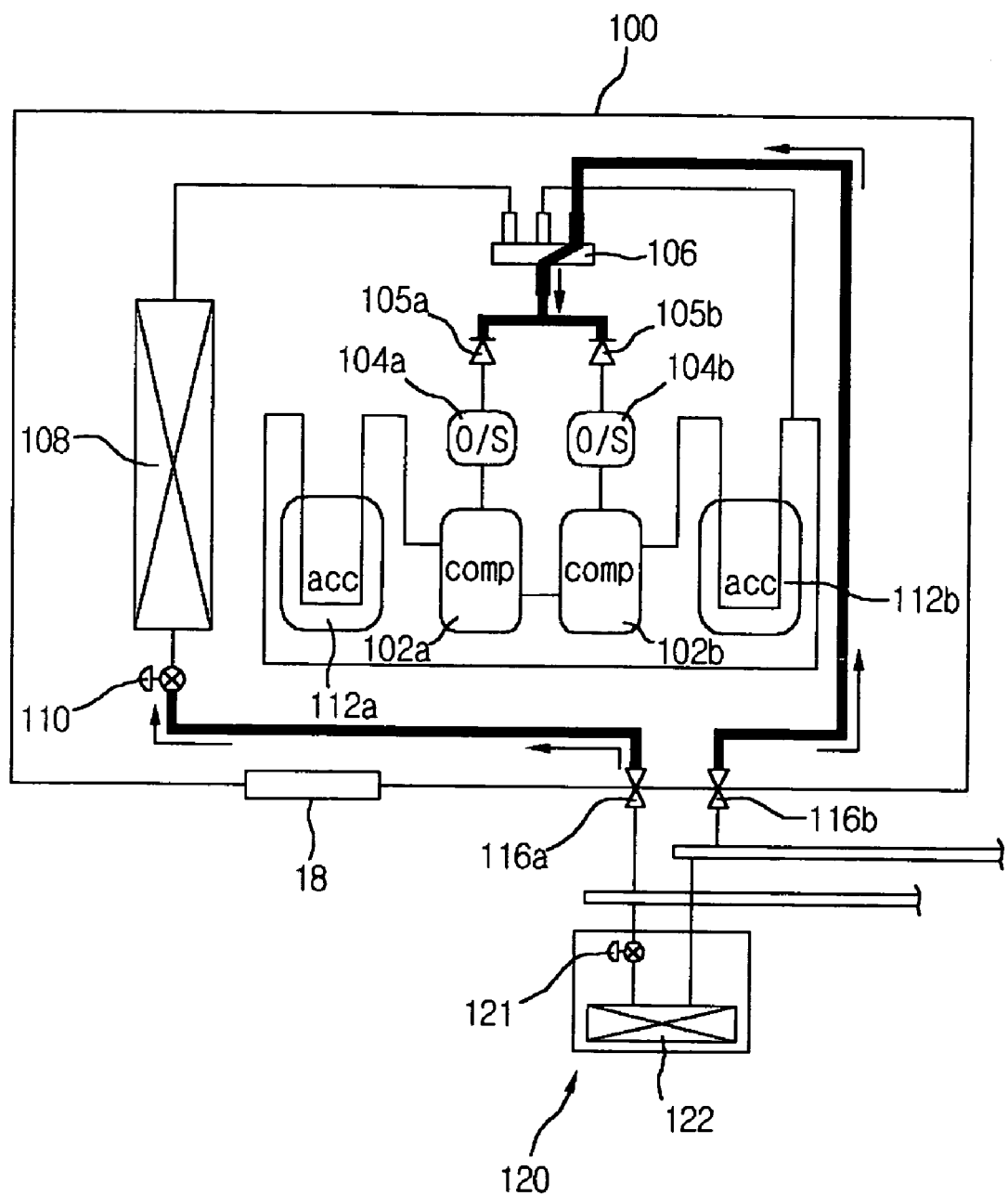
FIG. 4 is a schematic diagram of an air conditioner for preventing liquid refrigerant accumulation according to the present invention.
Figure 5:
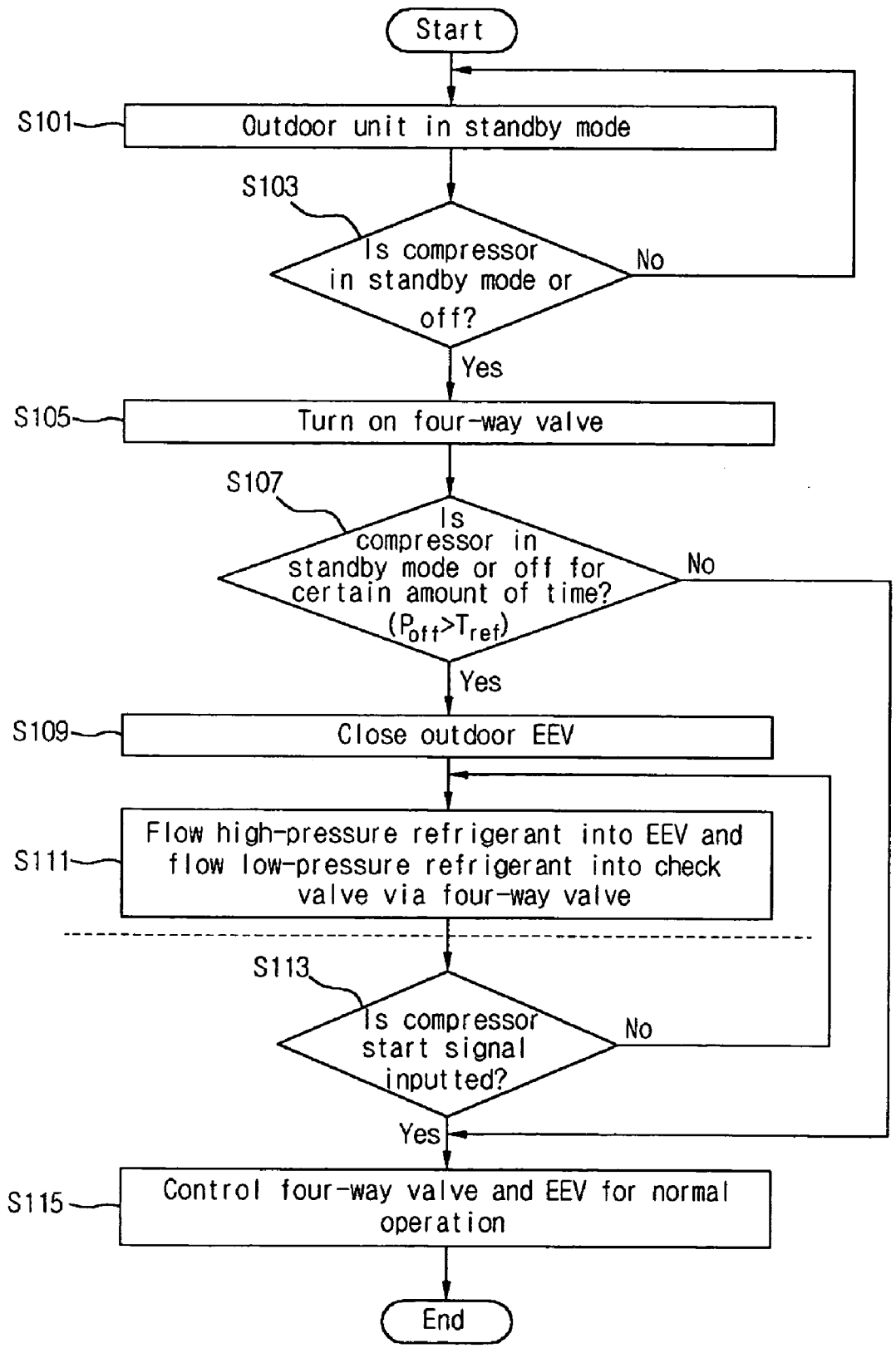
FIG. 5 is a flow chart describing the prevention of liquid refrigerant accumulation according to the present invention.

FIG. 4 is a schematic diagram of an air conditioner for preventing liquid refrigerant accumulation according to the present invention, and FIG. 5 is a flow chart describing a method for preventing liquid refrigerant accumulation according to the present invention.

Referring to FIG. 4, the air conditioner is an air conditioning or heating, air conditioning/heating combined multi air conditioner and includes at least one indoor unit 120, at least one outdoor unit 100, the indoor unit and the outdoor unit being connected through long/mid/short length pipes.

When the air conditioner is in cooling mode, compressors 102a, 102b compress refrigerant and this compressed refrigerant is supplied to an outdoor heat exchanger 108 through oil separators 104a, 104b, check valves 105a, 105b and a four-way valve 106.

In the outdoor heat exchanger 108 the refrigerant experiences heat exchange with outdoor air and changes to room-temperature refrigerant. Then the refrigerant passes an outdoor EEV 110 and changes to low-temperature, low-pressure refrigerant and is transferred, through an outdoor service valve 116a, to an indoor EEV 121 and an indoor heat exchanger 122 of the indoor unit. Therefore, a cooling operation is performed through heat exchange with indoor air.

The heat-exchanged refrigerant by the indoor heat exchanger 122 is changed to low-temperature, low-pressure refrigerant and accumulated in accumulators 112a, 112b via the four-way valve 106 of the outdoor unit 100.

The accumulators 112a, 112b connected to an inverter compressor 102a and a constant-speed compressor 102b separates liquid oil from the vapor refrigerant and sprays only the vapor refrigerant to the compressors 102a, 102b.

In heating mode, on the other hand, the air conditioner operates in opposite way to the driving cycle in cooling mode. At first, the compressors 102a, 102b compress refrigerant to high-temperature, high-pressure state and this compressed refrigerant passes the oil separators 104a, 104b and check valves 105a, 105b and flow line connected to the four-way valve 106 and is transferred to the indoor heat exchanger 122 of the indoor unit 120 through an indoor service valve 116b. In the indoor heat exchanger 122, the refrigerant experiences heat exchange with indoor air and decompressed, expanded through the indoor EEV 121 and then flows in the outdoor unit 100 through the service valve 116a. Later, this refrigerant is changed to low-temperature, low-pressure state through the outdoor EEV 110 and outdoor heat exchanger 108.

An arrow in FIG. 4 indicates a refrigerant flow line when the outdoor unit is in standby mode or off. Also, a solid line in the drawing illustrates a state where refrigerant flows into the outdoor EEV 110 and front of check valves 105a, 105b based on an algorithm according to an embodiment of the present invention.

In the meantime, the refrigerant that underwent heat exchange by the outdoor heat exchanger 108 flows in the accumulators 112a, 112b via the four-way valve 106, and liquid refrigerant is accumulated in the accumulators 112, 112b while vapor refrigerant is sprayed to the compressors through a suction pipe 115 again.

The present invention will now be explained with reference to FIG. 5.

When the outdoor unit of the multi air conditioner is in standby mode while the air conditioner being in on state, the compressors 102a, 102b are in standby mode or off (S101, S103).

When the compressors 102a, 102b are off (Poff) or in standby mode, the four-way valve 106 is on (S105).

It is confirmed whether the state (off or standby) of the compressors is continued for a certain period of time (Tref) (S107), and if so, the outdoor EEV 110 is closed (S109).

As the four-way valve 106 is on, the check valves 105a, 105b and a low-pressure pipe disposed on the discharge side of the compressors 102a, 102b are connected to each other. In other words, the four-way valve 106 is changed to a heating mode line and communicated to indoor service valve 116b and four-way valve 106 connected to the indoor heat exchanger 122 through the junction pipe and to the check valves 105a, 105b. Also, when the outdoor EEV 110 is closed, the indoor heat exchanger 122 and the outdoor EEV 110 are communicated.

Accordingly, when the compressors 102a, 102b are off, the refrigerant inside the indoor side pipe is used to fill up the four-way valve 106 and the check valves 105a, 105b through the indoor service valve 116b. Moreover, the refrigerant in a high-pressure pipe flows in the outdoor EEV 110 via an outdoor service valve 116a and a receiver 118 (S111).

With the above method, although the refrigerant may leak out of the check valves 105a, 105b, the oil section or accumulators 112a, 112b at the lower portion of the compressors are empty so that no liquid refrigerant can flow in at the beginning of the operation.

In the middle of the above procedure or after the above procedure is carried out, it is determined whether a compressor start signal is inputted (S113), and if so, the service valves 116a, 116b are opened and the four-way valve 106 and the outdoor EEV 110 are on (S115).

If the compressors are off or in standby mode for a designated period of time, the indoor/outdoor service valves 116b, 116a are closed or a certain valve can be opened or closed to prevent the refrigerant from entering the indoor unit.

Figure 6:
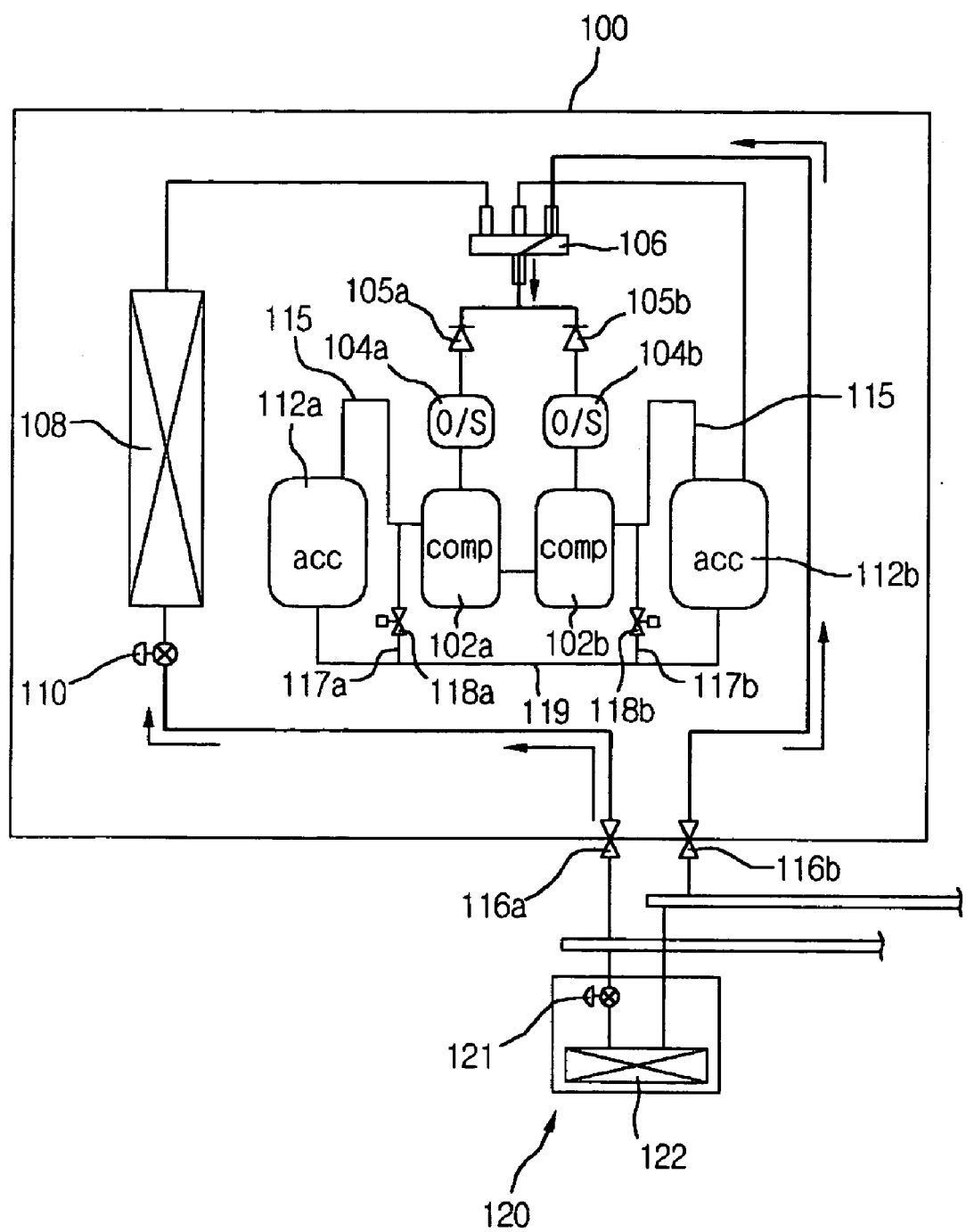
FIG. 6 and FIG. 7 are schematic diagrams illustrating an apparatus for preventing liquid refrigerant accumulation according to the present invention.

FIG. 6 illustrates an apparatus capable of recovering the accumulated refrigerant in the accumulators 112a, 112b.

As shown in FIG. 6, the refrigerant recovering apparatus includes a suction pipe 115 connecting the compressors 102a, 102b and the accumulators 112a, 112b; liquid recovery pipes 117a, 117b with one end being connected to the suction pipe 115 and the other end being connected to the lower ends of the accumulators 112a, 112b; and liquid recovery valves 118a, 118b installed at the liquid recovery pipes 117a, 117b, respectively, opening or closing according as whether liquid recovery is needed.

In the case that there is a plurality of accumulators 112a, 112b, the liquid recovery pipes 117a, 117b are connected to a pressure regulating pipe 119 connected to the lower end of the accumulators 112a, 112b, respectively.

The liquid recovery valves 118a, 118b are preferably solenoid valves or check valves.

Because the compressors 102a, 102b and the accumulators 112a, 112b are mostly filled with oil in cooling mode, the liquid recovery valves 118a, 118b are periodically opened to transfer the oil to the pressure regulating pipe 119 connected to the lower end of the accumulators 112a, 112b. Then the oil is transferred to the suction pipe 115 through the liquid recovery pipes 117a, 117b.

After being transmitted to the suction pipe 115, the oil is recovered to the compressors 102a, 102b.

As one embodiment, given that the compressors 102a, 102b are in operation, the liquid recovery valves 118a, 118b can be opened or closed first to recover the liquid refrigerant.

In addition, since a great amount of oil is accumulated at the bottom of the accumulators 112a, 112b, to recover that much oil, it is necessary to increase oil circulation of the system, which in turn protects the compressors and reduces the total oil filling amount.

In heating mode, on the other hand, as outdoor temperature is lowered, the compressors 102a, 102b are operated at high frequency for heating and thus, discharge temperature is raised. Generally, when the discharge temperature of the compressors 102, 102b is increased, the suction pipe 115 of the compressors is opened and high-pressure refrigerant is sprayed to the compressors 102a, 102b to lower the temperature of the compressors.

However, in a cold area the increase of discharge temperature of the compressor is frequently observed. Thus, liquid refrigerant recovery occurs more often and the driving cycle becomes instable, thereby decreasing heating capacity. For this reason, when the discharge temperature of the compressors 102, 102b is raised higher than a designated temperature range, the liquid recovery valves 118a, 118b connected to the lower end of the accumulators 112a, 112b are opened and low-pressure liquid refrigerant is sprayed over the compressors 102, 102b through the liquid recovery pipes 117a, 117b and suction pipe 115, thereby lowering the discharge temperature of the compressors.

With the application of the liquid recovery pipes 117a, 117b, it is now possible to recover the accumulated oil at the bottom of the oil recovery pipe, which was regarded impossible to do because of the structure of the oil recovery pipe in the related art accumulator. In addition, it is also possible to place the oil recovery pipe at a higher position than usual.

As the accumulated oil at the bottom of the accumulators 112, 112b is recovered, oil circulation of the system increases and the reliability of the compressors is secured. Even when the discharge temperature of the compressor is high, it is possible to lower the discharge temperature of the compressor without affecting the cycle but simply by providing the liquid refrigerant to the compressor.

In the above embodiment, it should be noted that number of liquid recovery valves corresponds to number of compressors with different functions (inverter/constant-speed compressors).

Figure 7:
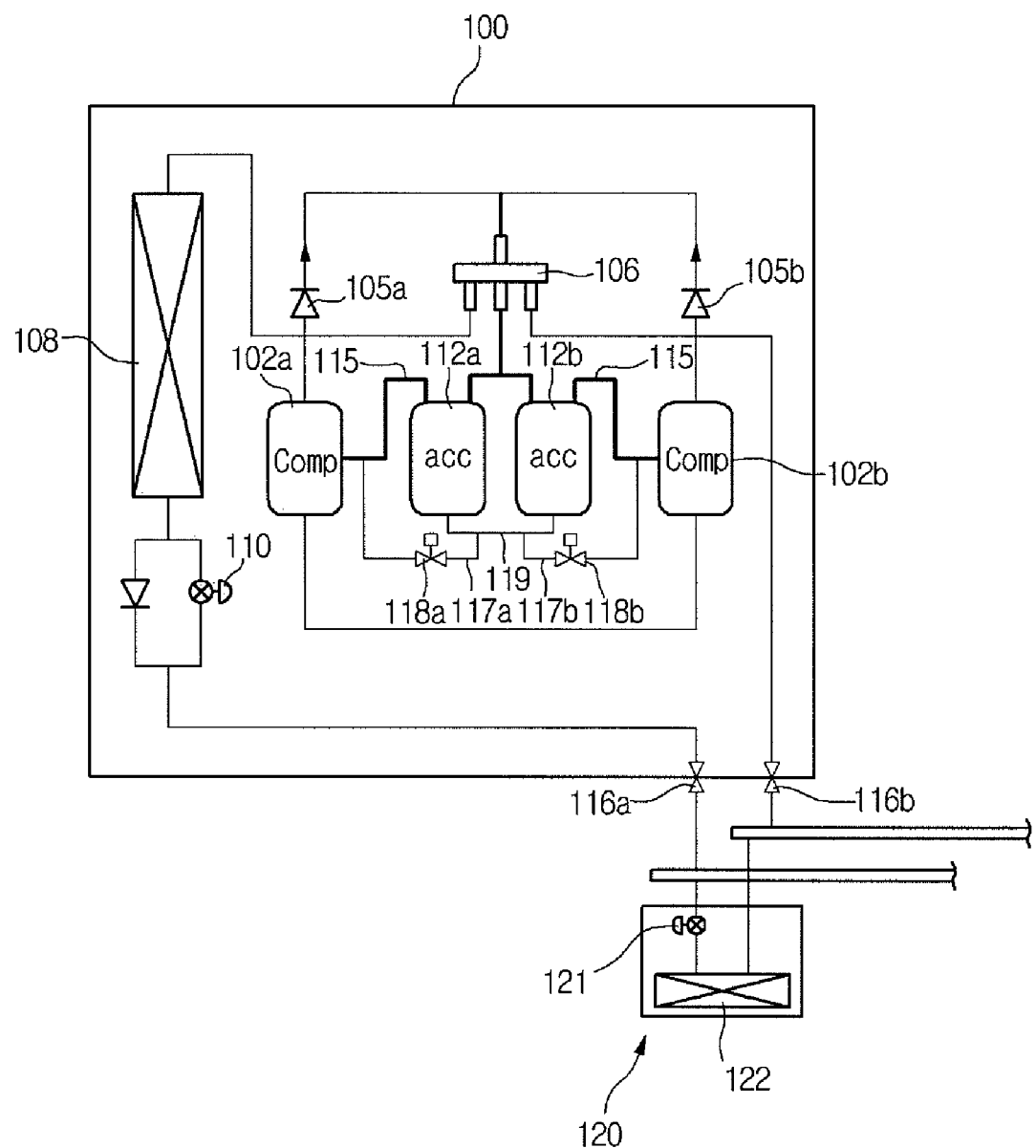

FIG. 7 illustrates another embodiment of the liquid recovery pipe 117a or 117b and the liquid recovery valve 118a or 118b of FIG. 6, but their operations are practically same.

Figure 8:
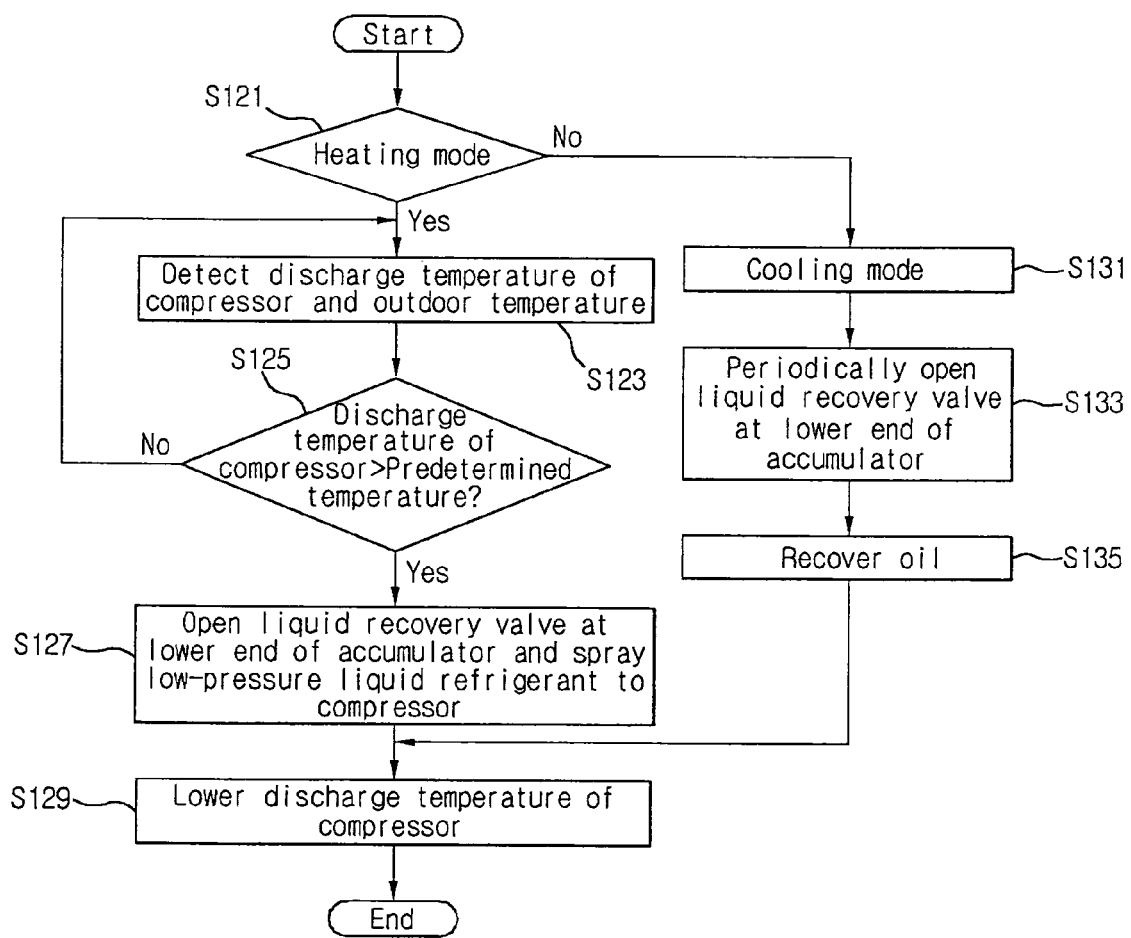
FIG. 8 is a flow chart describing a method for preventing liquid refrigerant accumulation by employing an apparatus in FIGS. 6 and 7.

FIG. 8 describes a method for preventing liquid refrigerant accumulation by using the system of FIG. 6. At first, it is determined whether the system is in heating mode (S121). If so, the discharge temperature of the compressor and outdoor temperature are detected (S123). If the discharge temperature of the compressor is higher than a designated temperature (S125), the liquid recovery valve at the lower end of the accumulator is opened and low-pressure liquid refrigerant is sprayed to the compressor (S127), to lower the discharge temperature of the compressor (S129).

In case of the cooling mode, not the heating mode (S131), the liquid recovery valve at the lower end of the accumulator is opened periodically and the oil is recovered to the compressor (S133, S135) and thus, the discharge temperature of the compressor is lowered (S129).

According to the present invention, therefore, when the air conditioner is not operated normally, the refrigerant flow line to the accumulator is changed so that the refrigerant does not flow into the compressor and the refrigerant at the lower end of the accumulator can be recovered.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for preventing liquid refrigerant accumulation of an air conditioner comprising at least one compressor and at least one accumulator, the apparatus comprising:
   a suction pipe connected to spray oil of the accumulator to the compressor;
   a liquid recovery pipe with one end being connected to the suction pipe and the other end being connected to the accumulator;
   a liquid recovery valve for controlling opening/closing of the liquid recovery pipe, wherein a number of the liquid recovery valve corresponds to a number of the compressors with different functions; and
   a pressure regulating pipe connected to the lower ends of the accumulators.

2. The apparatus according to claim 1, wherein the other end of the liquid recovery pipe is connected to a lower end of the accumulator to transfer the oil at the bottom of the accumulator to the suction pipe.

3. The apparatus according to claim 1, wherein the liquid recovery valve controls opening/closing of the liquid recovery pipe, to spray the liquid refrigerant to the compressor, thereby lowering discharge temperature of the compressor.

4. The apparatus according to claim 1, wherein the liquid recovery valve is a solenoid valve.

5. The apparatus according to claim 1, wherein the pressure regulating pipe is connected to the lower ends of the accumulators, respectively.

6. A method for preventing liquid refrigerant accumulation of an air conditioner, the method comprising:
   operating a compressor of the air conditioner in cooling or heating mode; and
   opening a liquid recovery valve for controlling a liquid recovery pipe connected to the compressor and an accumulator, and reducing oil, wherein said opening a liquid recovery valve depends on the temperature of the compressor in the heating mode.

7. The method according to claim 6, wherein if the air conditioner is in heating mode, the method comprises the steps of:

determining whether discharge temperature of the compressor is higher than a predetermined temperature;

if the discharge temperature of the compressor is higher than the predetermined temperature, opening the liquid recovery valve disposed at the lower end of the accumulator; and after opening the liquid recovery valve, spraying low-pressure liquid refrigerant to the compressor to lower the discharge temperature of the compressor.

8. The method according to claim 6, wherein if the air conditioner is in cooling mode, the liquid recovery valve is opened to recover oil at the lower end of the accumulator.

9. The method according to claim 8, wherein the liquid recovery valve for liquid recovery is opened periodically.

10. An apparatus for preventing liquid refrigerant accumulation of an air conditioner comprising at least one compressor and at least one accumulator, the apparatus comprising:

a suction pipe connected to spray oil of the accumulator to the compressor;

a liquid recovery pipe with one end being connected to the suction pipe and the other end being connected to the accumulator;

a liquid recovery valve for controlling opening/closing of the liquid recovery pipe; and a pressure regulating pipe connected to the lower ends of the accumulators.

11. The apparatus according to claim 10, wherein the other end of the liquid recovery pipe is connected to a lower end of the accumulator to transfer the oil at the bottom of the accumulator to the suction pipe.

12. The apparatus according to claim 10, wherein the liquid recovery valve controls opening/closing of the liquid recovery pipe, to spray the liquid refrigerant to the compressor, thereby lowering discharge temperature of the compressor.

13. The apparatus according to claim 10, wherein the liquid recovery valve is a solenoid valve.

14. The apparatus according to claim 10, wherein the pressure regulating pipe is connected to the lower ends of the accumulators, respectively.

* * * * *